(12) United States Patent
Coulson et al.

(10) Patent No.: US 6,915,376 B1
(45) Date of Patent: Jul. 5, 2005

(54) HOST CONTROLLED OPTIMIZATION OF DISK STORAGE DEVICES

(75) Inventors: Richard L. Coulson, Portland, OR (US); Knut S. Grimsrud, Forest Grove, OR (US)

(73) Assignee: Intel Corporation, Santa Clara, CA (US)

(*) Notice: Subject to any disclaimer, the term of this patent is extended or adjusted under 35 U.S.C. 154(b) by 736 days.

(21) Appl. No.: 09/218,037

(22) Filed: Dec. 22, 1998

(51) Int. Cl.[7] .............................................. G06F 12/00
(52) U.S. Cl. ..................................................... 711/112
(58) Field of Search ......................................... 711/112

(56) References Cited

U.S. PATENT DOCUMENTS

| | | | | |
|---|---|---|---|---|
| 4,420,715 A | * | 12/1983 | Lecourtier et al. | 388/814 |
| 4,517,641 A | * | 5/1985 | Pinheiro | 710/20 |
| 5,237,466 A | * | 8/1993 | Glaser et al. | 360/73.03 |
| 5,787,482 A | * | 7/1998 | Chen et al. | 711/112 |
| 5,886,489 A | * | 3/1999 | Rowan et al. | 318/439 |
| 6,138,176 A | * | 10/2000 | McDonald et al. | 711/114 |

OTHER PUBLICATIONS

Jacobson et al. "Disk scheduling algorithms based on rotational position," Tech. Report HPL–CSP–91–7, Hewlett–Packard Laboratories, (May 1995) [Online] Available: http://www.hpl.hp.com/personal/John¯Wilkes/papers/.*

Ciotti J. Mapping the Globe. http://www.wcc.hawaii.edu/aerospace/curriculum/mapping.html, 1997.*

* cited by examiner

Primary Examiner—Donald Sparks
Assistant Examiner—Woo H. Choi
(74) Attorney, Agent, or Firm—Kenyon & Kenyon

(57) ABSTRACT

A method, apparatus and computer program for causing a host computer to optimize execution of plural requests for access to plural data storage locations on a rotating disk, included in a disk storage device, based on a rotational position of the disk relative to a position of a read/write head. The host computer stores position information representing a rotational position of the disk, detects whether plural requests are to be executed, and when plural requests are to be executed, optimizes execution of the requests by reordering a sequence of execution of the requests in a manner to reduce a total service time of the requests based on the position information.

34 Claims, 4 Drawing Sheets

HOST CONTROLLED OPTIMIZATION OF DISK STORAGE DEVICES

FIELD OF THE INVENTION

The present invention relates to a method, apparatus and computer program for controlling the execution of plural requests for access to plural data storage locations on a rotating disk included in a disk storage device.

BACKGROUND OF THE INVENTION

Disk storage devices having controller interfaces such as Small Computer System Interface (SCSI), Integrated Drive Electronics (IDE), also known as Advanced Technology Attachment (ATA), Advanced Technology Attachment Packet Interface (ATAPI) etc., are typically used by a personal computer (PC) as storage. The PC serves as a host computer to the disk storage devices. Such a disk storage device includes various electronic circuits including, for example, a device processor for controlling the operation of the disk storage device in response to commands from a host processor which effects control of the PC. One of the control functions performed by the device processor and the electronic circuits in the disk storage device is to improve the performance of the disk storage device by optimizing the execution of plural commands requesting access to plural data storage locations on the disk. Optimizing the execution of plural commands attempts to reduce a service time for executing the plural commands. The service time can be reduced, for example, by reordering the sequence of execution of the plural commands. Reordering the sequence of the execution of the plural commands affects factors such as seek time, rotation time and other factors with respect to each command.

Seek time is the time required for the read/write head to move across the disk to a predetermined position where the desired data storage location can be accessed by the read/write head. Rotation time is the time required for the disk to rotate to a point where the desired data storage location can be accessed by the read/write head.

Accordingly, the optimization operation reduces the service time of the plural commands by reordering the sequence of execution of the plural commands affecting the seek time, rotation time and/or any other factors with respect to each of the commands.

Having the above-described optimization operation performed by the device processor and the electronic circuits in the disk storage device has various disadvantages. For example, inclusion of the device processor and the electronic circuits can cause the disk storage device to be complex. Also, in order to perform other more sophisticated optimizing operations or to modify or add to the existing optimizing operation, the device processor may require re-programming, which can be difficult under normal circumstances, and additional electronic circuits may be required. Further, the device processor in such a disk storage device performs many functions the host processor can perform. Still further, the inclusion of the device processor and the electronic circuits in the disk storage device adds additional costs to the disk storage device, thereby increasing the price of the host computer.

Even beyond the above, ATA type disk storage devices do not support the storage and eventual execution of multiple outstanding commands requesting access to the disk storage device, since no queue for storing the commands is provided in the disk storage device. Thus, the above described optimization where the service time of plural commands is reduced by reordering the sequence of execution of the plural commands cannot be conducted.

SUMMARY OF THE INVENTION

The present invention provides a method, apparatus and computer program for causing a host computer to optimize execution of requests for access to data storage locations on a rotating disk, included in a disk storage device, based on a rotational position of the disk relative to a position of a read/write head of the disk storage device. The host computer optimizes execution of requests for access, according to the present invention, by storing position information representing a rotational position of the disk relative to the position of the read/write head, detecting whether plural requests for access are to be executed, and when plural requests are to be executed, optimizing execution of the requests by reordering a sequence of execution of the requests in a manner to reduce total service time of the requests based in part on the position information.

BRIEF DESCRIPTION OF THE DRAWINGS

The scope of the present invention will be apparent from the following detailed description, when taken in conjunction with the accompanying drawings, and such detailed description and specific examples, while indicating exemplary embodiments of the invention, are given by way of illustration only, since various changes and modifications within the spirit and scope of the invention will become apparent to those skilled in the art from this detailed description, in which.

DETAILED DESCRIPTION

Figure 1:
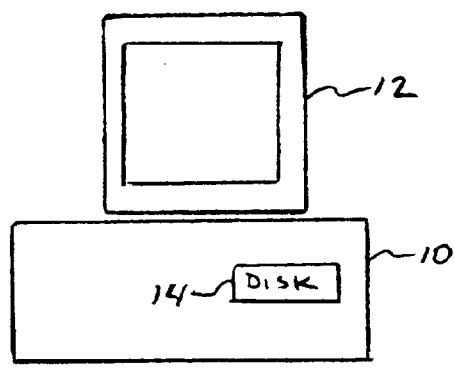
FIG. 1 is illustrative of an exemplary personal computer hosting a disk storage device.

The present invention is operated in a computer such as that illustrated in FIG. 1. The computer illustrated in FIG. 1 is shown, for example, as a PC. However, the invention is applicable to any computing or information processing apparatus such as a laptop, palmtop, etc., having a host processor and a disk storage device. The PC includes a case 10 containing various electronic circuitry in the form of integrated circuit devices mounted on printed circuit boards. The printed circuit boards include a motherboard having a host processor mounted thereon. The processor performs various processing operations to effect control of the operation of the electronic circuitry and other electronic devices connected to the processor through the motherboard. Various peripheral devices such as a display 12 and a disk storage device 14 are hosted by the PC. The display 12 displays information concerning the processing operations performed by the processor. The disk storage device 14 serves as a storage for storing data or programs used in the processing operations performed by the processor. The disk storage device 14 can be of any type (i.e., hard disk, CD Rom, etc.), including those having controller interfaces such as SCSI, IDE, ATA, ATAPI, etc.

Figure 2:
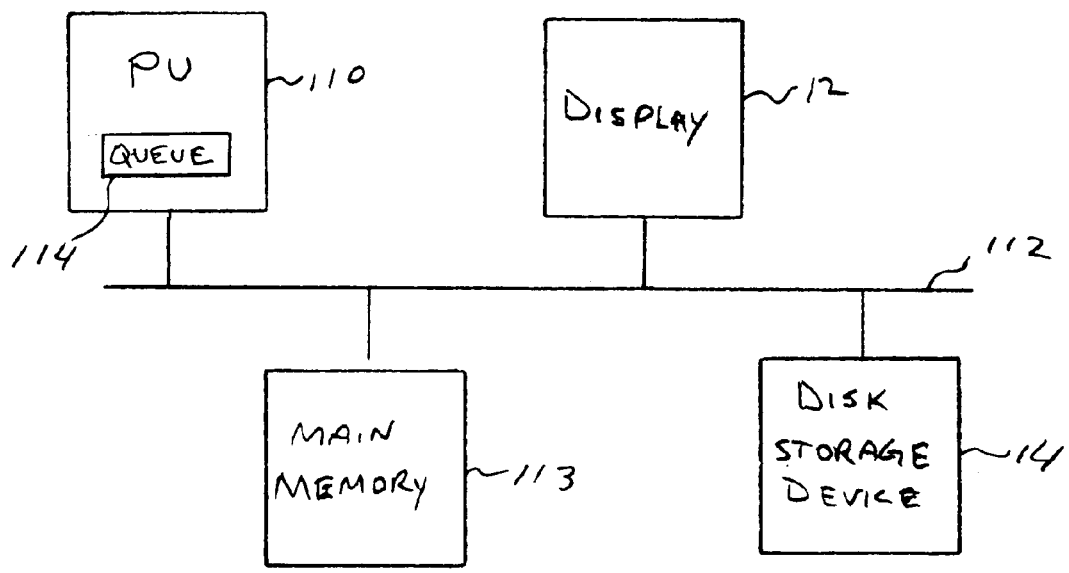
FIG. 2 is an exemplary circuit diagram of the personal computer.

For example, as illustrated in FIG. 2, the motherboard connects the processor, represented as a processor unit (PU) 110, to each of the peripheral devices and other electronic circuitry. As illustrated in FIG. 2, PU 110 is connected to a system bus 112 which is connected to, for example, a main memory 113, display 12 and the disk storage device 14. The PU 110 includes a command queue 114 for storing a plurality of commands requesting access to the disk storage device 14 waiting to be executed. The disk storage device 14 may be connected to the system bus by a controller interface (i.e. SCSI, IDE, ATAPI, etc.). The PC operates, for example, under control of the PU 110 which executes instructions of a program retrieved from main memory 113. Upon execution of instructions, PU 110 performs processing operations and displays information concerning the processing operations on display 12. The PU 110 can also write or read information concerning the processing operations to or from the main memory 113 and/or a rotating disk included in the disk storage device 14 via a read/write head. When writing or reading data to or from the disk of disk storage device 14, PU 110 forms a command which requests access to a specified data storage location on the disk so that the read or write operation can be performed. The command is stored in the command queue 114 along with other commands to be executed by disk storage device 14. When the command is read from command queue disk storage device 14, in response to the command, performs the operation requested by the command by positioning the read/write head to a particular position over the disk so that the data storage location, for which access has been requested, can be accessed. Thereafter, the read or write operation is performed to the data storage location.

As described above, a typical disk storage device includes a device processor and various electronic circuits which control the operation of the disk storage device and perform operations to optimize the performance of the device. Optimizing the performance of the disk storage device includes, for example, performing operations to change the order in which commands are executed, thereby reducing service time. Other factors including those know to one of ordinary skill in the art can also be used to optimize the performance of a disk storage device. The device processor in the disk storage device performs many functions that the host processor, represented by PU 110, can perform including the optimizing operation. Thus, the present invention can reduce the cost of the host computer since the use of some circuits can be reduced or eliminated. Further, by allowing PU 110 to perform the optimizing operation across the controller interface of the disk storage device, other more sophisticated optimizing operations can be performed based on the availability of increased MIPs in host processor. Still further, modifications or additions can be freely made (e.g., via software updates) to the existing optimizing operation. Even further, the present invention, when applied to an ATA type disk storage device, can allow optimization operations to be performed that are normally not possible. As described above, ATA disk storage devices do not support the servicing of multiple outstanding commands requesting access to the disk storage device, since a queue is not provided in the disk storage device. Thus, optimizing by reordering the sequence of execution of commands to reduce total service time of the commands is not possible in ATA type disk storage devices. The present invention provides the ability to perform such operations to ATA type disk storage devices.

Figure 3:
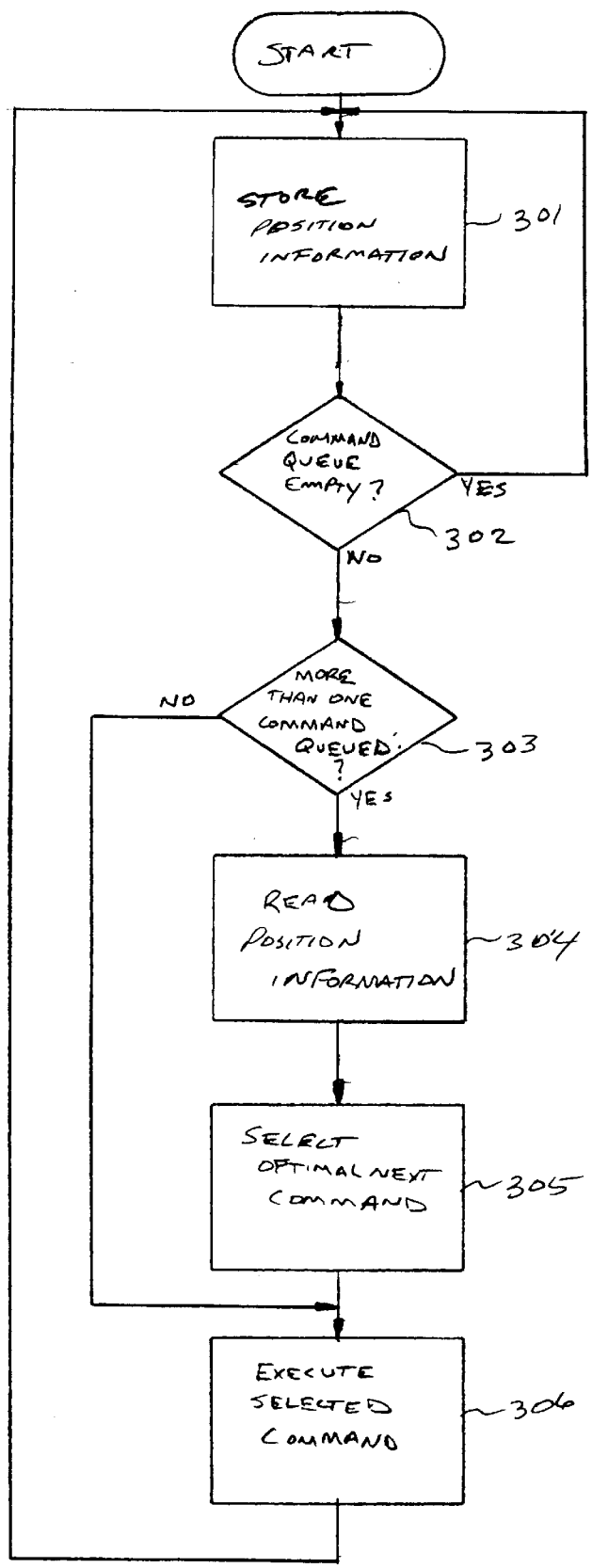
FIG. 3 is an exemplary flowchart of a first optimization operation of the present invention.
Figure 4:
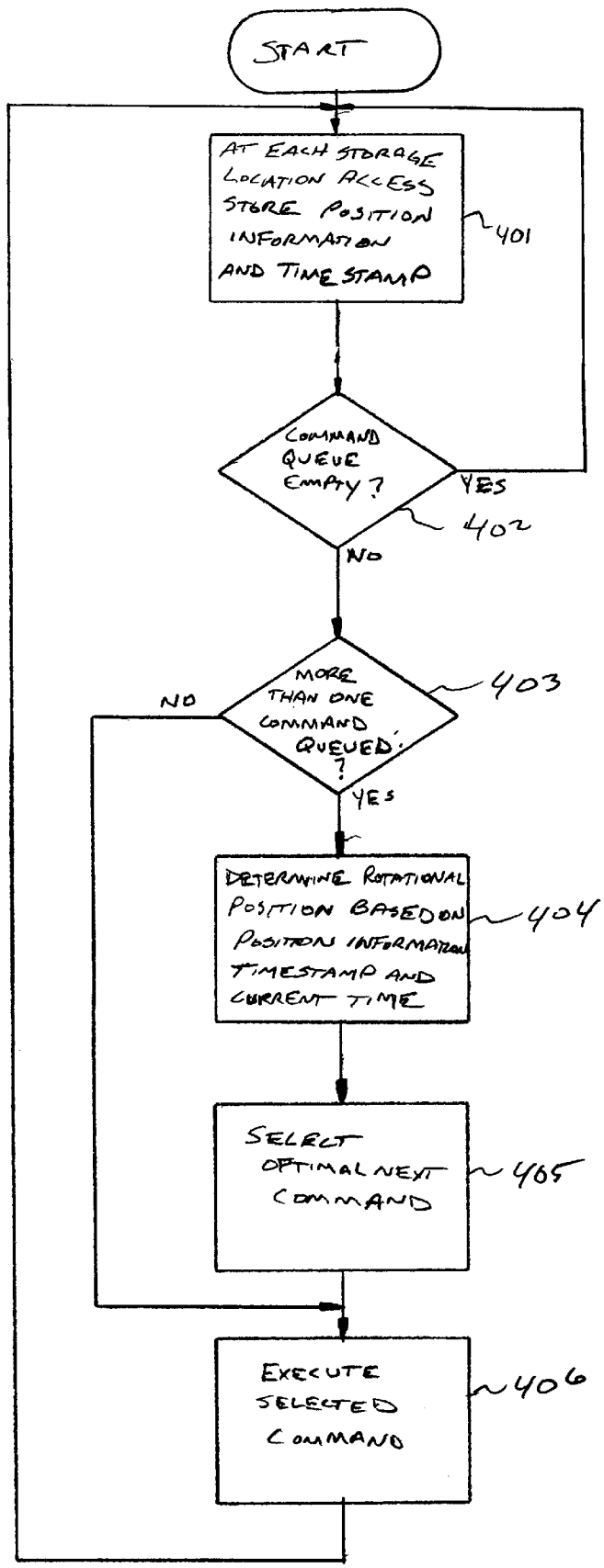
FIG. 4 is an exemplary flowchart of the second optimization operation of the present invention.
Figure 5:
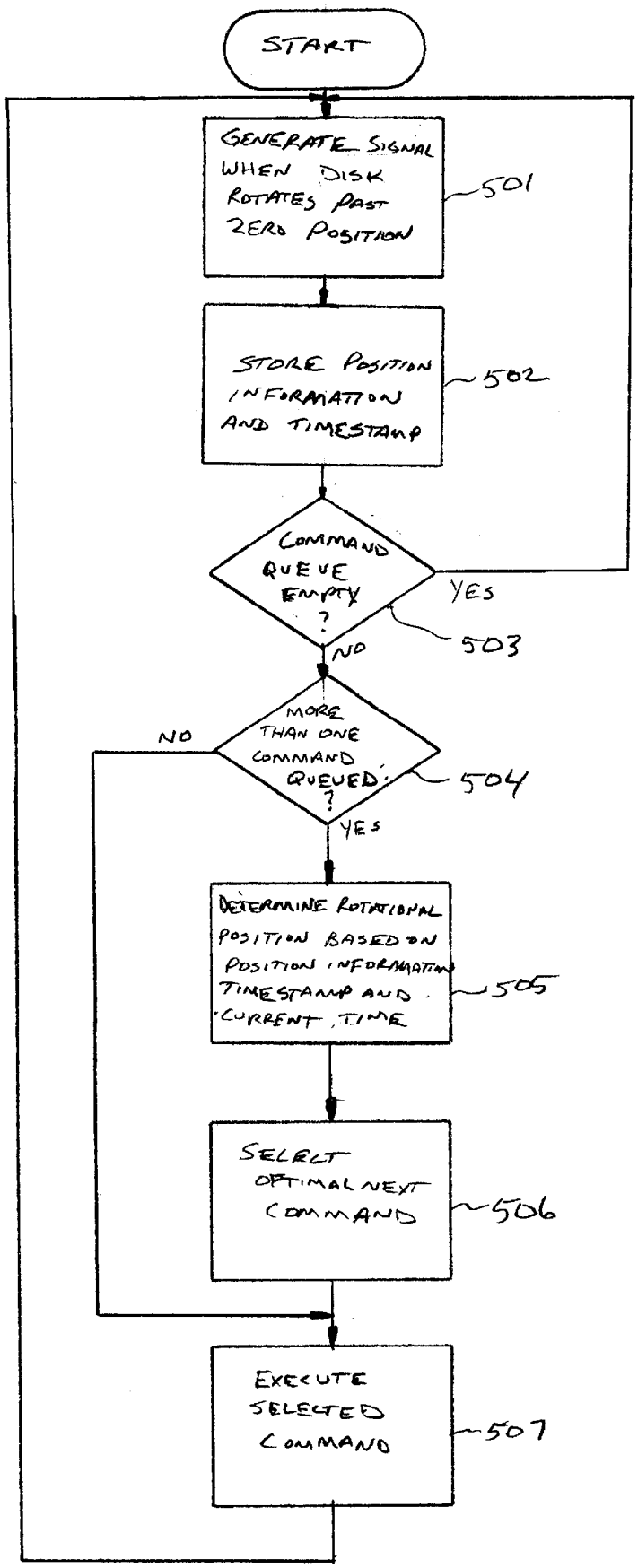
FIG. 5 is an exemplary flowchart of the third optimization process of the present invention.

The optimizing operation performed by the host computer results from the execution of instructions of a computer program by PU 110. The computer program can, for example, be part of the operating system of the host computer, retrieved from a floppy disk, uploaded from a memory contained in disk storage device 14 at initialization or part of the Basic Input/Output Subsystem (BIOS) of the host computer. The optimizing operation performed by the host computer is illustrated in the flowcharts of FIGS. 3–5. It should be noted that each of the steps of each flowchart corresponds to one or more instructions of the computer program.

In the present invention, the optimizing operation can utilize information regarding the current rotational position of the disk of the disk storage device. Thus, PU 110 can be provided with information concerning the current rotational position of the disk relative to a predetermined fixed point or relative to the current position of the read/write head. Information concerning the current rotational position of the disk can be obtained directly or calculated based upon previously obtained information. The present invention can, for example, provide three different optimizing operations, each of which optimizes the execution of plural requests for access to plural data storage locations by use of information representing the current rotational position of the disk. The optimizing operations differ from each other by the manner in which information concerning the current rotational position of the disk is obtained.

The first optimizing operation is illustrated by the flowchart in FIG. 3. According to the flowchart, as the disk of the disk storage device rotates, position information representing the current rotational position of the disk relative to the position of the read/write head or a predetermined fixed point is stored in a register (step 301). The register may be provided, for example, in the PU 110, main memory 113, the disk storage device, or other circuitry including those known to one of ordinary skill in the art. It should be noted that step 301 is performed in a manner that the stored data is valid when read.

When each command, for example, a command requesting access to a data storage location is generated, the command is stored in the command queue 114. The command queue 114 can be provided, for example, in the PU 110 as shown, in main memory 113, or by other circuitry including those know to one of ordinary skill in the art. The command queue 114 is checked, for example, when a command is added or removed from the command queue 114, to determine whether the command queue is empty or not (step 302). If the command queue 114 is empty, then step 301 is performed again. If the command queue 114 is not empty, then an operation is performed to determine whether the command queue 114 contains more than one command (step 303). If the command queue 114 contains only one command then the one command is executed (step 306).

If the queue contains more than one command or, for example, a command, which causes multiple locations to be accessed or, for example, some other factor has been detected, then optimization is to be performed. Optimization as described above attempts to reduce the total service time of execution of the commands by, for example, reordering the sequence of execution of the commands. Thus, the most recent position information representing the rotational position of the disk or information of another factor used to perform the optimization is required and such information is read from the register (step 304). The other factors for which optimization can be conducted may, for example, be a command which requests access to multiple storage location. Thus, the distances between the sectors to be accessed may be desirable.

Based on the position information read from the register, the optimum next command is selected for execution (step 305). The optimum next command, for example, may be a request for access to a data storage location nearest to the position of the read/write head or other algorithms that may reduce total service time. The other algorithms could, for example, be Shortest Seek Time First (SSTF) algorithm. Thereafter, the selected command is executed (step 306). Accordingly, for example, the present invention can reorder the sequence of execution of the commands such that a command which requests access to a data storage location nearest to the current position of the read/write head is executed first and a command which requests access to a data storage location farthest from the position of the read/write head is executed last such that the total service time is reduced. Steps 301–306 are continually performed until no commands are left in the command queue 114. Thus, the commands are executed in a manner such that the read/write head is successively positioned to access the next nearest data storage location to which access has been requested in a manner to reduce total service time.

The second optimizing operation is illustrated by the flowchart in FIG. 4. According to the flowchart each time a data storage location is accessed, position information representing the calculated rotational position based on the disk location accessed and the geometry of the disk and time information (timestamp) representing the time the access was conducted are stored in memory (step 401). It should be noted that this step is performed whenever a data storage location is accessed. Thus, information concerning the position and time of the most recent access to a data storage location is always available.

Thereafter, a determination is made whether the command queue 114 is empty (step 402) and whether more than one command is stored in the command queue 114 (step 403). If the command queue 114 only contains one command, then the one command is executed (step 406). If the command queue 114 is not empty and more than one command is stored in the command queue 114 or, for example, the command queue 114 contains a command, which causes multiple locations to be accessed, or some other factor has been detected, then optimization is performed.

When optimization is to be performed the rotational position of the disk is determined based on the previously stored position information and the time information and current time information representing the current time. The current time can be obtained, for example, from the highest level clock of the host computer such as a clock used by PU 110. The time information and the current time information are used to determine the time that has elapsed since the last data storage location has been accessed. The elapsed time is used along with the position information, and information concerning the rotational speed of the disk to determine the current rotational position of the disk (step 404). Since the disk is rotated at a constant rotational speed, a relationship exists between the amount of rotational movement of the disk and elapsed time. Thus, the current rotational position of the disk can be calculated when most recent rotational position and elapsed time is known. Based on the current rotational position of the disk, the optimal next command is selected (step 405). The optimal command may be a request for access to a data storage location nearest to the current position of the read/write head. Thereafter, the selected command is executed (step 406). Steps 401–406 are continually performed until no commands are left in the command queue 114.

The third optimizing operation is illustrated by the flowchart in FIG. 5. According to the flowchart a signal is generated each time a particular point on the disk rotates past a predetermined fixed point. The generating of signal is unique to ATA type disk storage devices. The signal indicates, for example, that a zero position of the disk has rotated past the predetermined fixed point (step 501). In response to the signal, position information representing, for example, a zero position is stored along with time information (timestamp) representing a time the signal was generated (step 502). A determination is made as to whether a plurality of commands for execution are stored in the command queue 114 (steps 503 and 504). If the command queue 114 contains only one command, then the one command is executed (step 507). If the command queue 114 contains a plurality of commands or, for example, a command which causes multiple locations to be accessed, or some other factor has been detected, then optimization is performed. Accordingly, the current rotational position of the disk is determined based on the position information, the time information and current time information (step 505). More specifically, an elapsed time is determined based on the time information and the current time information, and the elapsed time is used along with the position information and rotational speed information of the disk to determine the current rotational position of the disk.

Thereafter, an optimal next command is selected (step 506). The optimal command, for example, may be a request for access to a data storage location nearest to the current position of the read/write head. The selected command is then executed (step 507). Each of steps 501–507 are continually performed until the last command in the command queue 114 has been executed.

While the present invention has been described in detail and pictorially in the accompanying drawings, it is not limited to such details since many changes and modification recognizable to these of ordinary skill in the art having the benefit of this invention may be made to the invention without departing from the spirit and scope of the invention, and all such modifications as would be obvious to one skilled in the art and/or which become possible as technology develops, are intended to be included within the scope of the following claims.

We claim:

1. A method for a host processor to optimize access performance of a disk included in a storage device, comprising:

storing position information representing a rotational position of said disk;

determining whether one or more requests for access to data storage locations on said disk are received at a command queue to be executed; and when plural requests are received at the command queue to be executed, reordering a sequence of execution of said requests to access data storage locations on said disk such that a request for access to a data storage location nearest to a position of a read/write head according to said position information is executed first, and a request for access to a data storage location farthest away from said position of said read/write head according to said position information is executed last so as to reduce a total service time of said requests.

2. A method according to claim 1, wherein said storage device is an Advanced Technology Attachment (ATA) type disk storage device.

3. A method according to claim 1, wherein, when a single request for access to data storage locations on said disk is received at said command queue, said single request is executed without any reordering.

4. A method for a host processor to optimize access performance of a disk included in a storage device, comprising:
    when a data storage location on said disk has been accessed, storing position information representing a rotational position of said location, and time information of said disk;
    detecting whether one or more requests for access to data storage locations on said disk are received at a command queue to be executed;
    when plural requests are received at the command queue to be executed, determining a current rotational position of said disk based on said position and time information, and current time information; and
    reordering a sequence of execution of said requests to access data storage locations on said disk in a manner to reduce a total service time of said requests based on said current rotational position.

5. A method according to claim 4, wherein said storage device is an Advanced Technology Attachment (ATA) type disk storage device.

6. A method according to claim 4, wherein said determining step comprises the steps of:
    retrieving said position information, said time information and said current time information;
    determining an elapsed time based on said time information and said current time information; and
    determining said current rotational position of said disk based on said position information, said elapsed time, and rotational speed information, said elapsed time, and rotational speed information indicating a pre-set constant rotational speed of said disk.

7. A method according to claim 4, wherein said reordering step comprises the step of:
    reordering a sequence of execution of said requests such that a request for access to a data storage location nearest to said position of a read/write head according to said current rotational position of said disk is executed first, and a request for access to a data storage location farthest away from said position of said read/write head according to said current rotational position is executed last so as to reduce said total service time of said requests.

8. A method for a host processor to optimize access performance of a disk included in a storage device, comprising:
    generating a signal indicating detection of a predetermined point on said disk;
    storing, in response to said signal, position information of said disk, and time information;
    detecting whether plural requests for access to data storage locations on said disk are received at a command queue to be executed;
    when plural requests are received at the command queue to be executed, determining a current rotational position of said disk based on said position and time information, and current time information; and
    reordering a sequence of execution of said requests to access data storage locations on said disk in a manner to reduce a total service time of said requests based on said current rotational position.

9. A method according to claim 8, wherein said storage device is an Advanced Technology Attachment (ATA) type disk storage device.

10. A method according to claim 8, wherein said determining step comprises the steps of:
    retrieving said position information, said time information and said current time information;
    determining an elapsed time based on said time information and said current time information; and
    determining said current rotational position of said disk based on said position information, said elapsed time and rotational speed information indicating a pre-set constant rotational speed of said disk.

11. A method according to claim 8, wherein said reordering step comprises the step of:
    reordering a sequence of execution of said requests such that a request for access to a data storage location nearest to said position of a read/write head according to said current rotational position of said is executed first, and a request for access to a data storage location farthest away from said position of said read/write head according to said current rotational position is executed last so as to reduce said total service time of said requests.

12. A computer program stored on a computer readable storage medium for execution by a processor of a host computer in which a storage device is installed to optimize access performance of said storage device, said computer program when executed causes said processor of said host computer to perform the steps of:
    storing position information representing a rotational position of a disk included in said storage device;
    determining whether one or more requests for access to data storage locations on said disk are received at a command queue from said processor of said host computer to be executed; and
    when plural requests are received at the command queue to be executed, reordering a sequence of execution of said requests to access data storage locations on said disk such that a request for access to a data storage location nearest to a position of a read/write head according to said position information is executed first, and a request for access to a data storage location farthest away from said position of said read/write head according to said position information is executed last so as to reduce a total service time of said requests.

13. A computer program according to claim 12, wherein said storage device is an Advanced Technology Attachment (ATA) type disk storage device.

14. A computer program according to claim 12, wherein, when a single request for access to data storage locations on said disk is received at said command queue, said single request is executed without any reordering.

15. A computer program according to claim 12, wherein said storage medium is also included in said storage device to permit said computer program to be uploaded to said host computer for execution at initialization of said host computer.

16. A computer program stored on a computer readable storage medium for execution by a processor of a host computer in which a storage device is installed to optimize access performance of said storage device, said computer program when executed causes said processor of said host computer to perform the steps of:
    when a data storage location on said disk has been accessed, storing position information representing a rotational position of said location, and time information of said disk;
    detecting whether one or more requests for access to data storage locations on said disk are received at a command queue from the processor of the host computer to be executed;

when plural requests are received at the command queue to be executed, determining a current rotational position of said disk based on said position and time information, and current time information; and reordering a sequence of execution of said requests to access data storage locations on said disk in a manner to reduce a total service time of said requests based on said current rotational position.

17. A computer program according to claim 16, wherein said storage device is an Advance Technology Attachment (ATA) type disk storage device.

18. A computer program according to claim 16, wherein said determining step comprises the steps of:

retrieving said position information, said time information and said current time information;

determining an elapsed time based on said time information and said current time information; and determining said current rotational position of said disk based on said position information, said elapsed time, and rotational speed information indicating a pre-set constant rotational speed of said disk.

19. A computer program according to claim 16, wherein said reordering step comprises the step of:

reordering a sequence of execution of said requests such that a request for access which requests access to a data storage location nearest to said position of a read/write head according to said current rotational position of said disk is executed first, and a request for access to a data storage location farthest away from said position of said read/write head according to said current rotational position is executed last so as to reduce said total service time of said requests.

20. A computer program according to claim 16, wherein said storage medium is also included in said storage device to permit said computer program to be uploaded to said host computer for execution at initialization of said host computer.

21. A computer program stored on a computer readable storage medium for execution by a processor of a host computer in which a storage device is installed to optimize access performance of said storage device, said computer program when executed causes said processor of said host computer to perform the steps of:

generating a signal indicating detection of a predetermined point on a disk included in said storage device;

storing, in response to said signal, rotational position information of said disk, and time information;

detecting whether plural requests for access to data storage locations on said disk are received at a command queue from said processor of said host computer to be executed;

when plural requests are received at the command queue to be executed, determining a current rotational position of said disk based on said position and time information, and current time information; and reordering a sequence of execution of said requests to access data storage locations on said disk in a manner to reduce a total service time of said requests based on said current rotational position.

22. A computer program according to claim 21, wherein said storage device is an Advance Technology Attachment (ATA) type disk storage device.

23. A computer program according to claim 21, wherein said determining step comprises the steps of:

retrieving said position information, said time information and said current time information;

determining an elapsed time based on said time information and said current time information; and determining said current rotational position of said disk based on said position information, said elapsed time and rotational speed information indicating a pre-set constant rotational speed of said disk.

24. A computer program according to claim 21, wherein said reordering step comprises the step of:

reordering a sequence of execution of said requests such that a request for access which requests access to a data storage location nearest to said position of a read/write head according to said current rotational position of said is executed first, and a request for access to a data storage location farthest away from said position of said read/write head according to said current rotational position is executed last so as to reduce said total service time of said requests.

25. A computer program according to claim 21, wherein said storage medium is also included in said storage device to permit said computer program to be uploaded to said host computer for execution at initialization of said host computer.

26. A host computer comprising:

a storage device which stores data for use by said host computer;

a host processor which performs processing operations for said host computer and performs reordering execution of requests for access to data storage locations on a disk, included in said disk storage device, based on a rotational position of said disk relative to a position of a read/write head; and a register which stores position information representing a rotational position of said disk, wherein said host processor detects whether plural requests for access to data storage locations on said disk are to be executed, and when said plural requests are to be executed, reorders a sequence of execution of said requests to access data storage locations on said disk in a manner to reduce a total service time of said requests based on said position information.

27. A host computer according to claim 26, wherein said storage device is an Advanced Technology Attachment (ATA) type disk storage device.

28. A host computer according to claim 26, wherein said host processor reorders a sequence of execution of said requests such that a request for access to a data storage location nearest to a position of a read/write head according to said rotational position of said disk represented by said position information is executed first, and a request for access to a data storage location farthest away from said position of said read/write head according to said position information is executed last so as to reduce said total service time of said requests.

29. A method, in a processor of a host computer in which a disk storage device is installed, for optimizing execution of multiple requests for access to a rotating disk, included in said disk storage device, based on a rotational position of said disk relative to a position of a read/write head, said method in said processor of said host computer comprising the steps of:

storing position information representing a rotational position of said disk;

detecting whether multiple requests posted at a command queue to be executed can be optimized; and when said multiple requests posted at the command queue can be optimized, reordering a sequence of execution of said multiple requests to access data storage locations on said disk such that a request for access to a data storage location nearest to a position of a read/write head according to said position information is executed first, and a request for access to a data storage location farthest away from said position of said read/write head according to said position information is executed last so as to reduce a total service time of said multiple requests.

30. A method according to claim 29, wherein said storage device is an Advanced Technology Attachment (ATA) type disk storage device.

31. A computer program stored on a computer readable storage medium for execution by a processor of a host computer in which a disk storage device is installed for optimizing execution of multiple requests for access to a disk, in said disk storage device, based on a rotational position of said disk relative to a position of a read/write head, said computer program when executed causes said processor of said host computer to perform the steps of:

storing position information representing a rotational position of said disk;

detecting whether multiple requests posted at a command queue to be executed can be optimized; and when said multiple requests posted at the command queue can be optimized, reordering a sequence of execution of said multiple requests to access data storage locations on said disk such that a request for access to a data storage location nearest to a position of a read/write head according to said position information is executed first, and a request for access to a data storage location farthest away from said position of said read/write head according to said position information is executed last so as to reduce a total service time of said multiple requests.

32. A computer program according to claim 31, wherein said storage device is an Advanced Technology Attachment (ATA) type disk storage device.

33. A host computer comprising:

a storage device which stores data for use by said host computer;

a host processor which performs processing operations for said host computer and performs optimizing of execution of multiple requests for access to data storage locations on a disk, included in said storage device, based on a rotational position of said disk relative to a position of a read/write head; and a register which stores position information representing a rotational position of said disk, wherein said host processor detects whether multiple requests posted at a command queue to be executed can be optimized, and when said multiple requests posted at the command queue can be optimized, reorders a sequence of execution of said multiple requests to access data storage locations on said disk in a manner to reduce a total service time of said multiple requests based on said position information.

34. A host computer according to claim 33, wherein said storage device is an Advanced Technology Attachment (ATA) type disk storage device.

* * * * *

UNITED STATES PATENT AND TRADEMARK OFFICE
CERTIFICATE OF CORRECTION

PATENT NO. : 6,915,376 B1
DATED : July 5, 2005
INVENTOR(S) : Richard L. Coulson et al.

It is certified that error appears in the above-identified patent and that said Letters Patent is hereby corrected as shown below:

<u>Column 10,</u>
Lines 12-13, "position of said is executed" should be -- of said disk is executed --.

Signed and Sealed this

Fifteenth Day of November, 2005

JON W. DUDAS
*Director of the United States Patent and Trademark Office*